(12) United States Patent
Lu et al.

(10) Patent No.: US 11,784,341 B2
(45) Date of Patent: Oct. 10, 2023

(54) HIGH-ENERGY DENSITY AND LOW-COST FLOW ELECTROCHEMICAL DEVICES WITH MOVING RECHARGEABLE ANODE AND CATHODE BELTS

(71) Applicant: The Chinese University of Hong Kong, Hong Kong (CN)

(72) Inventors: Yi-Chun Lu, Hong Kong (CN); Zengyue Wang, Hong Kong (CN); Long Yin Simon Tam, Hong Kong (CN); Qingli Zou, Beijing (CN); Guangtao Cong, Beijing (CN)

(73) Assignee: The Chinese University of Hong Kong, Hong Kong (CN)

( * ) Notice: Subject to any disclaimer, the term of this patent is extended or adjusted under 35 U.S.C. 154(b) by 468 days.

(21) Appl. No.: 15/371,466

(22) Filed: Dec. 7, 2016

(65) Prior Publication Data

US 2017/0162900 A1 Jun. 8, 2017

Related U.S. Application Data

(60) Provisional application No. 62/264,745, filed on Dec. 8, 2015.

(51) Int. Cl.
*H01M 10/02* (2006.01)
*H01M 10/42* (2006.01)
(Continued)

(52) U.S. Cl.
CPC ........... *H01M 10/02* (2013.01); *H01M 4/381* (2013.01); *H01M 4/382* (2013.01); *H01M 4/386* (2013.01);
(Continued)

(58) Field of Classification Search
CPC ............. H01M 10/02; H01M 10/4214; H01M 10/0562; H01M 10/054; H01M 10/052;
(Continued)

(56) References Cited

U.S. PATENT DOCUMENTS 3,260,620 A 7/1966 Gruber
3,454,429 A * 7/1969 Gruber .................... H01M 8/00
429/127
(Continued)

FOREIGN PATENT DOCUMENTS

CN 102983347 A 3/2013
CN 204102997 U 1/2015
(Continued)

OTHER PUBLICATIONS

European Search Report for 16872417.7 dated May 19, 2019, 7 pages.
(Continued)

*Primary Examiner* — Edward Tso
*Assistant Examiner* — Aaron Piggush
(74) *Attorney, Agent, or Firm* — Kilpatrick Townsend & Stockton LLP

(57) ABSTRACT

The invention provides novel high-energy density and low-cost flow electrochemical devices incorporating solid-flow electrodes, and further provides methods of using such electrochemical devices. Included are anode and cathode current collector foils that can be made to move during discharge or recharge of the device. Solid-flow devices according to the invention provide improved charging capability due to direct replacement of the conventional electrode stack, higher volumetric and gravimetric energy density, and reduced battery cost due to reduced dimensions of the ion-permeable layer.

23 Claims, 14 Drawing Sheets

Region A  Region B  Region C

(51) Int. Cl.
| | |
|---|---|
| *H01M 4/58* | (2010.01) |
| *H01M 4/38* | (2006.01) |
| *H01M 4/505* | (2010.01) |
| *H01M 4/485* | (2010.01) |
| *H01M 10/052* | (2010.01) |
| *H01M 10/054* | (2010.01) |
| *H01M 4/62* | (2006.01) |
| *H01M 10/0562* | (2010.01) |

(52) U.S. Cl.
CPC ........... *H01M 4/485* (2013.01); *H01M 4/505* (2013.01); *H01M 4/582* (2013.01); *H01M 4/5825* (2013.01); *H01M 4/625* (2013.01); *H01M 10/052* (2013.01); *H01M 10/054* (2013.01); *H01M 10/4214* (2013.01); *H01M 10/0562* (2013.01); *H01M 2220/10* (2013.01); *H01M 2220/20* (2013.01)

(58) Field of Classification Search
CPC .... H01M 10/04; H01M 4/381; H01M 4/5825; H01M 4/505; H01M 4/382; H01M 2220/20
USPC ...... 429/223, 224, 231.1, 231, 208, 247, 68; 320/128, 112
See application file for complete search history.

(56) References Cited

U.S. PATENT DOCUMENTS

| | | | | | |
|---|---|---|---|---|---|
| 3,619,400 | A | * | 11/1971 | Eisner | C25D 5/627 204/216 |
| 3,620,843 | A | * | 11/1971 | Clifford | H01M 12/08 429/61 |
| 4,680,104 | A | * | 7/1987 | Kunkle | B01D 33/042 204/629 |
| 4,976,827 | A | * | 12/1990 | Maly | C25D 11/10 205/139 |
| 5,756,228 | A | * | 5/1998 | Roseanou | H01M 6/30 429/68 |
| 5,804,053 | A | * | 9/1998 | Vaccaro | C25D 5/54 205/161 |
| 5,837,120 | A | * | 11/1998 | Forand | C25D 5/67 205/93 |
| 5,958,619 | A | | 9/1999 | Celeste et al. | |
| 6,149,781 | A | * | 11/2000 | Forand | C25F 7/00 204/239 |
| 6,335,111 | B1 | * | 1/2002 | Faris | H01M 4/42 429/404 |
| 6,558,829 | B1 | | 5/2003 | Faris et al. | |
| 2005/0031938 | A1 | * | 2/2005 | Burdine | H01M 8/002 429/81 |
| 2005/0100781 | A1 | * | 5/2005 | Jang | H01M 12/06 429/61 |
| 2007/0034529 | A1 | * | 2/2007 | Bard | G01N 27/403 205/775 |
| 2010/0047671 | A1 | * | 2/2010 | Chiang | H01M 8/20 429/50 |
| 2010/0285370 | A1 | * | 11/2010 | Xia | H01M 4/70 429/246 |
| 2011/0189520 | A1 | * | 8/2011 | Carter | B60L 50/64 429/107 |
| 2011/0217578 | A1 | * | 9/2011 | Albano | C23C 14/562 429/94 |
| 2011/0274948 | A1 | * | 11/2011 | Duduta | H01M 8/184 429/50 |
| 2012/0189921 | A1 | * | 7/2012 | Kolosnitsyn | H01M 4/0404 429/337 |
| 2012/0298527 | A1 | * | 11/2012 | James | C02F 1/46114 205/743 |
| 2013/0298389 | A1 | * | 11/2013 | Hohenthanner | H01M 4/0402 29/623.5 |
| 2014/0016247 | A1 | * | 1/2014 | Beguin | H01G 11/32 361/505 |
| 2014/0042989 | A1 | * | 2/2014 | Gogotsi | H01G 11/32 320/167 |
| 2014/0197034 | A1 | * | 7/2014 | Yaar | C02F 1/4691 204/668 |
| 2015/0140455 | A1 | * | 5/2015 | Imano | H01M 12/08 429/405 |
| 2016/0190640 | A1 | * | 6/2016 | Visco | H01M 10/0562 429/322 |

FOREIGN PATENT DOCUMENTS

| | | |
|---|---|---|
| CN | 201420458195 U | 1/2015 |
| DE | 102010048983 A1 | 10/2010 |
| JP | 59-158075 | 9/1984 |
| JP | 2013-515335 A | 5/2013 |
| JP | 2015-32356 A | 2/2015 |
| WO | 2014-101859 A1 | 7/2014 |

OTHER PUBLICATIONS

Machine translation of DE 102010048983 by ABB AG (cited in the European Search Report) and publication with original figures.
Machine translation of WO 2014-101859 byYiyang Kinglon New Materials (cited in the European Search Report) and publication with original figures.
English translation of CN 204102997 (referenced above).

* cited by examiner

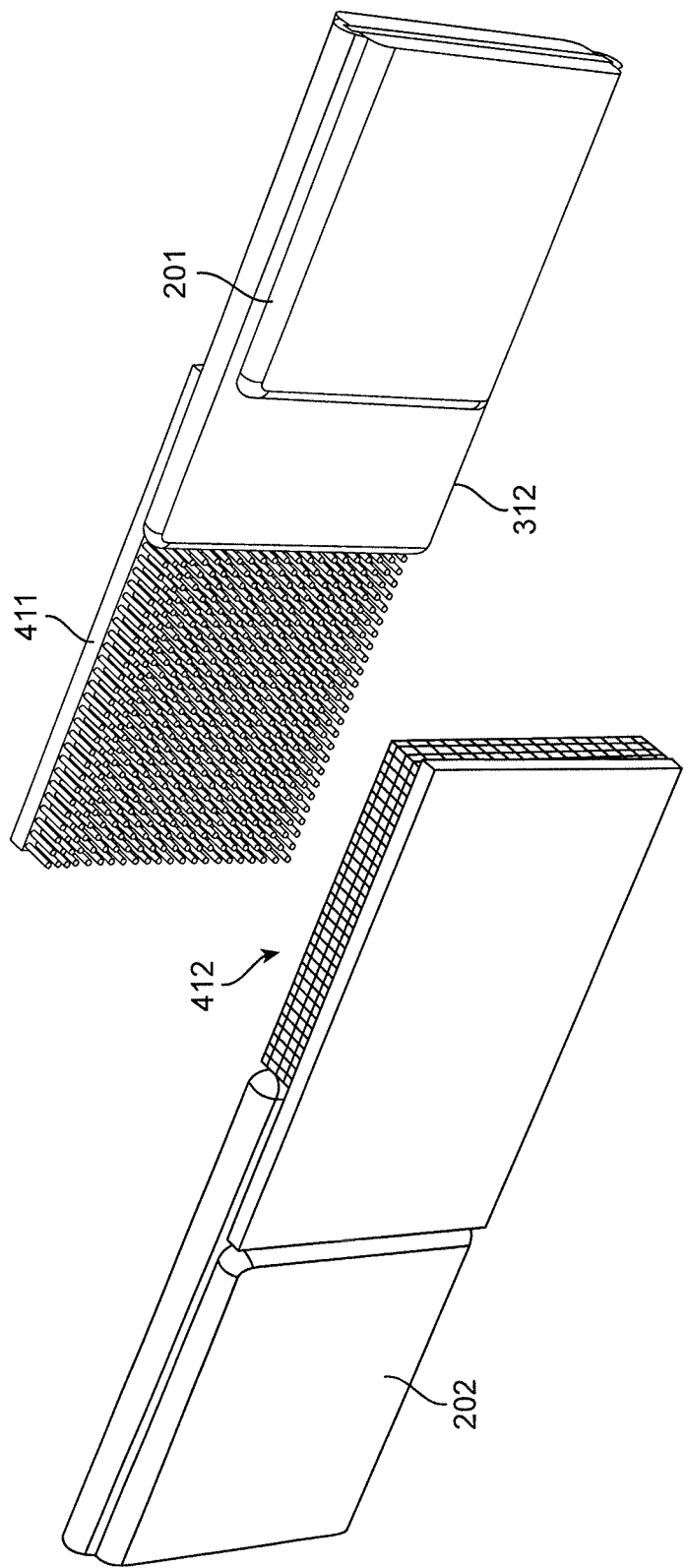

Region A    Region B    Region C

HIGH-ENERGY DENSITY AND LOW-COST FLOW ELECTROCHEMICAL DEVICES WITH MOVING RECHARGEABLE ANODE AND CATHODE BELTS

RELATED APPLICATION

This application claims the priority benefit of U.S. provisional patent application 62/264,745, filed Dec. 8, 2015. The priority application is hereby incorporated herein by reference in its entirety for all purposes.

FIELD

This application comes within the genral field of controlled electrical power storage and recovery. More specifically, the devices use electrochemical cells and opposing moving foils to achieve improved volumetric and gravimetric energy density.

BACKGROUND OF THE INVENTION

The increased performance requirements for transportation vehicles (e.g., electric and hybrid automobiles) and buildings (e.g., residences, offices, factories, etc.), as well as the adverse environmental effects related to fossil fuel consumption, have resulted in a need for improved alternative energy sources. Because solar and wind power are generally unstable and intermittent, much research has been focused on rechargeable batteries for storing and delivering electrical energy and power. Existing rechargeable batteries, however, are associated with high manufacturing costs, low energy densities, and poor power performance and are therefore inadequate to meet many of the current and future needs.

Flow electrochemical devices such as redox flow batteries are a promising solution for electric/hybrid vehicle applications and large-scale electricity storage, because such devices have significant design flexibility and a mode of operation that advantageously decouples power from energy capacity. In a redox flow battery, the two chemical components used for charge transfer are dissolved in respective solutions and separated by an ion-permeable membrane, with ion exchange occurring across the membrane while both liquids circulate in their distinct and separate spaces. However, redox flow batteries suffer from low energy density and high cost, which significantly decreases the feasibility of such batteries for both stationary and transportation applications. Increasing the energy density and reducing the cost of flow electrochemical devices has been the subject of major research efforts and has motivated several new design concepts to date.

One such design is disclosed by Chiang et al. in U.S. Patent Publication No. 2010/0047671, which describes semi-solid flow devices that incorporate solid suspensions of electroactive materials in a flow configuration. The device demonstrated superior energy density compared to conventional flow batteries by using precipitated suspensions of active materials that exceed the solubility limits of the active materials. Stated another way, Chiang et al. increased the concentration of the active materials by using a suspension instead of dissolving the active materials in solution.

Although the use of suspensions of active materials increases the energy density of flow batteries, this approach is associated with a number of disadvantages. First, the energy density provided by the semi-solid system is not sufficient to meet the demands of high energy density applications such as electric vehicles. Second, the semi-solid fluids require large amounts of carbon in order to provide acceptable electrical conductivity. This not only reduces the packing density of the active materials, it also creates substantial limitations on power capability due to the low electrical conductivity of the semi-solid fluids as compared to conventional solid electrodes used in conventional lithium-ion batteries. Third, the semi-solid suspensions tend to undergo phase separation and thus require surface treatment and/or solvent additives to prevent separation of the phases. Fourth, the semi-solid fluids exhibit significantly higher viscosity than the catholyte and anolyte fluids used in conventional flow batteries. As a result, the pumping of the viscous fluids consumes a considerable amount of the generated power, thereby reducing the overall efficiency of the battery system.

What is needed are improved flow electrochemical devices that overcome the above-described disadvantages. This invention fulfills this and other related needs.

SUMMARY OF THE INVENTION

The invention provides novel high-energy density and low-cost flow electrochemical devices incorporating solid-flow electrodes, and further provides methods of using such electrochemical devices.

In one embodiment, the invention provides a solid-flow electrochemical device, including a reaction region that comprises an anode current collector member (e.g., a copper rod), a cathode current collector member (e.g., an aluminum rod), an electrically-insulating ion-permeable membrane disposed between the anode and cathode current collector members, and an electrolyte (e.g., aqueous and/or non-aqueous electrolyte solution). The electrochemical device further includes an anode current collector foil (e.g., copper foil) coated with an anode active material such as lithium metal. The anode current collector foil is in electronic contact with and disposed around the anode current collector member. A separate cathode current collector foil (e.g., aluminum foil) is coated with a cathode active material such as lithium iron phosphate ($LiFePO_4$), and is in electronic contact with and disposed around the cathode current collector member. The electrochemical device further includes at least one motor configured to simultaneously rotate the anode current collector foil around the anode current collector member and the cathode current collector foil around the cathode current collector member during a charge or discharge operation. Each of the respective current collector foils can rotate in one direction during a discharge cycle, and in the opposite direction during a charge cycle.

In some embodiments, the electrochemical device can include an anode active material storage region and a cathode active material storage region, such that the reaction region is disposed between the two active material storage regions. Each respective active material storage region can include one or more rollers, or other types of components, to store the current collector foils coated with active material in the discharged and charged states. In some embodiments, each respective active material region can include two rollers, i.e., a first and a second roller. Each current collector foil can individually extend from the first rollers around the current collector members to the second rollers. During a discharge operation, a motor in each respective storage region can cause the rollers to rotate, thereby causing each current collector foil coated with active material to rotate around the respective current collector members, with the active material coatings facing the electrically-insulating ion-permeable membrane disposed between the current collector members. As a result of the rotation, fresh (i.e., charged) active material can continuously be unwound from the first roller and rotated into position for ion transfer, while the spent (i.e., discharged active material) is moved out of the reaction region and wound around the second roller for storage. During a charging operation, the motors can cause the direction of rotation to be reversed, thereby allowing the discharged active material to be converted back into charged active material on both the anode and cathode sides of the device.

The anode and cathode active materials coated on the respective current collector foils can include any suitable material according to various embodiments of the invention. Suitable active materials include, but are not limited to, metal fluorides, metal oxides, $LiMPO_4$ intercalation compounds, carbon, carbon-containing materials, metals, alloys, metalloids, semiconductors (e.g., Si), nanomaterials, organic redox compounds, sulfur-containing compounds, selenium-containing compounds, and the like.

BRIEF DESCRIPTION OF THE DRAWINGS

FIGS. 4A and 4B show a schematic perspective view of two electrode belts of FIG. 2, with Velcro connection at end of the electrode belts, according to some embodiments of the invention.

DETAILED DESCRIPTION

I. General

The invention provides novel high-energy density and low-cost flow electrochemical devices incorporating solid-flow electrodes, and further provides methods of using such electrochemical devices.

Figure 1:
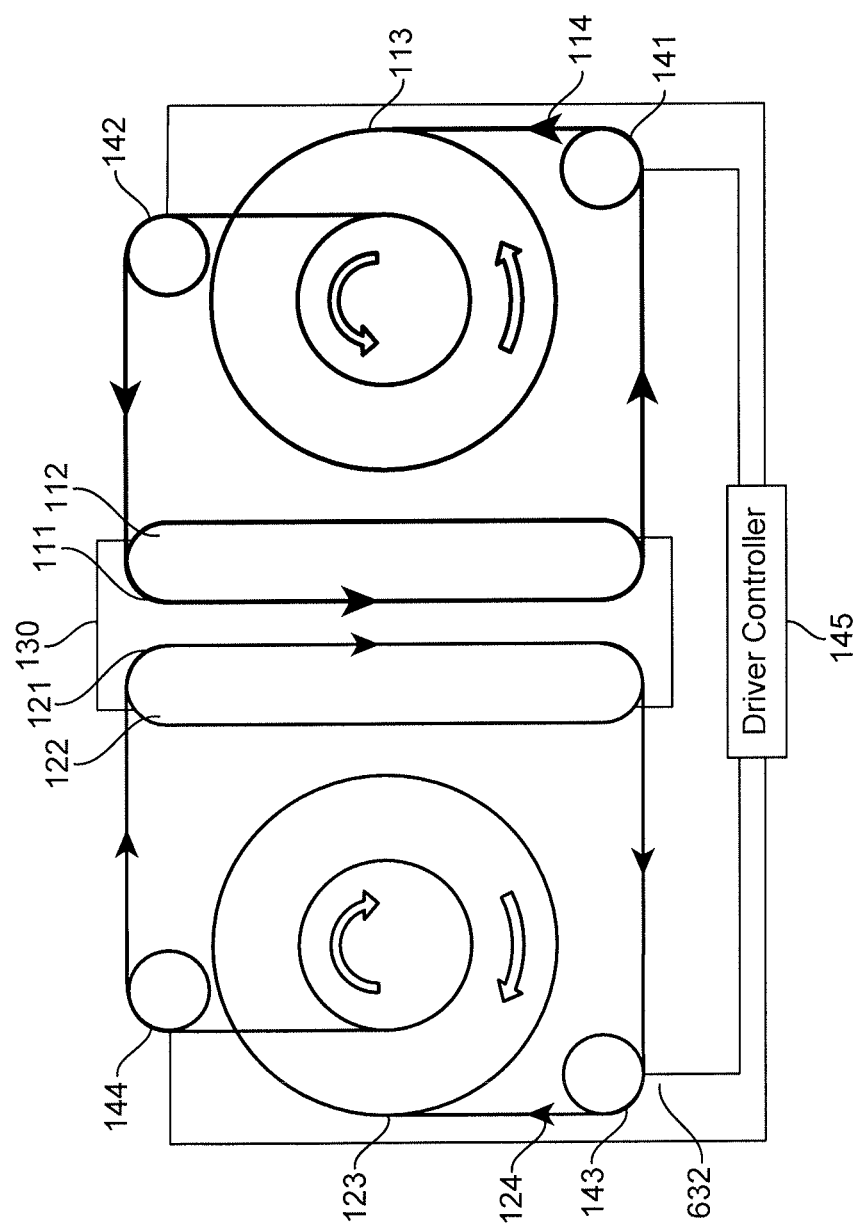
FIG. 1 shows a shows a schematic diagram of a solid flow battery

Referring to FIG. 1, the solid-flow electrodes can include active materials coated on metallic current collector foils, which are rotated concentrically around metallic current collector members (e.g., rods). The cathode and anode current collector foils 111 and 112 coated with active material can be rotated around their respective current collector members 112 and 122 such that they enter the active area of the reaction region simultaneously, with an electrical-insulating ion-permeable membrane positioned between the anode and cathode active materials. Extra electrode belts for the half cells are stored in rollers 113 and 123 and is transported through the reaction region, in directions shown by the arrows 114 and 124. The electrode belts are driven by guide wheels and motors 141-144. A liquid electrolyte 130 can be present in the region of the membrane to allow for generated ions to flow from one active material coating to the other, and with generated electrons moving in or out of the battery by way of the respective current collector members through an external circuit.

Embodiments of the invention provide a number of advantages over existing solutions. For example, the solid-flow electrochemical cells described herein provide for higher energy density compared to existing flow batteries, including the semi-flow device described by Chiang et al., for a given electrode active material. This is due in part to solid-state electrodes having a higher concentration of active material than liquid or semi-solid state electrodes. Moreover, the higher energy density is achieved while preserving the "flowable" nature of flow electrochemical cells. As another example, embodiments of the invention do not compromise the electrical conductivity of the electrode material. In contrast, the semi-solid approach requires the addition of considerable amounts of carbon to make up for the losses in electrical conductivity.

As yet another example, the electrochemical devices described herein do not incur phase separation because the electrode materials are present in one phase, namely a solid. This significantly reduces costs by eliminating the requirement that suspensions be optimized to inhibit separation of phases. As yet another example, the power required to rotate the active material-coated foils is significantly less than that required to pump the highly viscous suspensions used in the semi-solid approach. And, as still another example, some embodiments of the invention reduce the dimensions required for the ion-permeable membrane, thereby further reducing the materials costs associated with generally expensive membrane layers.

II. Solid-Flow Electrochemical Devices

The invention provides a solid-flow electrochemical device. The solid-flow electrochemical device utilizes electrode belts as the media for energy storage. The anode belt comprise an anode current collector foil coated with an anode active material, and a cathode current collector foil coated with a cathode active material.

The solid-flow electrochemical device can include a reaction region that comprises an anode current collector member, a cathode current collector member, an electrically-insulating ion-permeable membrane disposed between the anode current collector member and the cathode current collector member, and an electrolyte. The solid-flow electrochemical device can further include an anode current collector foil coated with an anode active material, the anode current collector foil being in contact with and disposed around the anode current collector member, and a cathode current collector foil coated with a cathode active material, the cathode current collector foil being in contact with and disposed around the cathode current collector member. At least one motor can be configured to simultaneously rotate the anode current collector foil around the anode current collector member and the cathode current collector foil around the cathode current collector member during a charge or discharge operation.

Figure 12A:
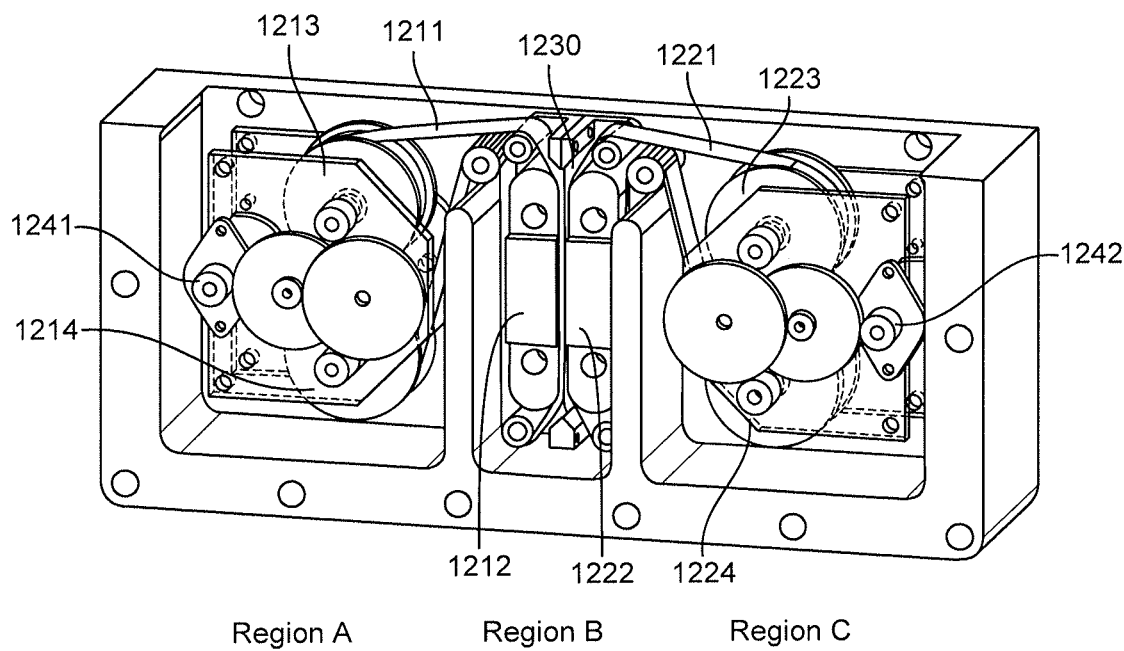
FIGS. 12A and 12B show a schematic of another proof-of-concept solid-flow electrochemical device, according to some embodiments of the invention.

By way of example, in the device shown in FIG. 12A, the anode and cathode belts are not coated. In the device shown in FIG. 10, the anode and cathode belts are completed coated with an electrically insulating ion permeable membrane. In the device shown in FIG. 2, the anode and cathode belts are partly coated with an electrically insulating ion permeable membrane, with a metallic conductive edge 240 exposed on one side. The belt is sealed on the other side with an electrically insulating edge.

The solid-flow electrochemical device can include a reaction region that comprises an anode current collector member, a cathode current collector member, and an electrolyte. In the example shown in FIG. 12A, an electrically insulating ion permeable membrane 1230 is deposed between the anode current collector member and the cathode current collector member, separating the reaction region into the anode reaction region and the cathode reaction region. The anode belt 1211 passes through the anode reaction region, electronically connected to the anode current collector member 1221 in static or sliding contact. The cathode belt 1212 passes through the cathode reaction region, electronically connected to the cathode current collector member 1222 in static or sliding contact.

Figure 2:
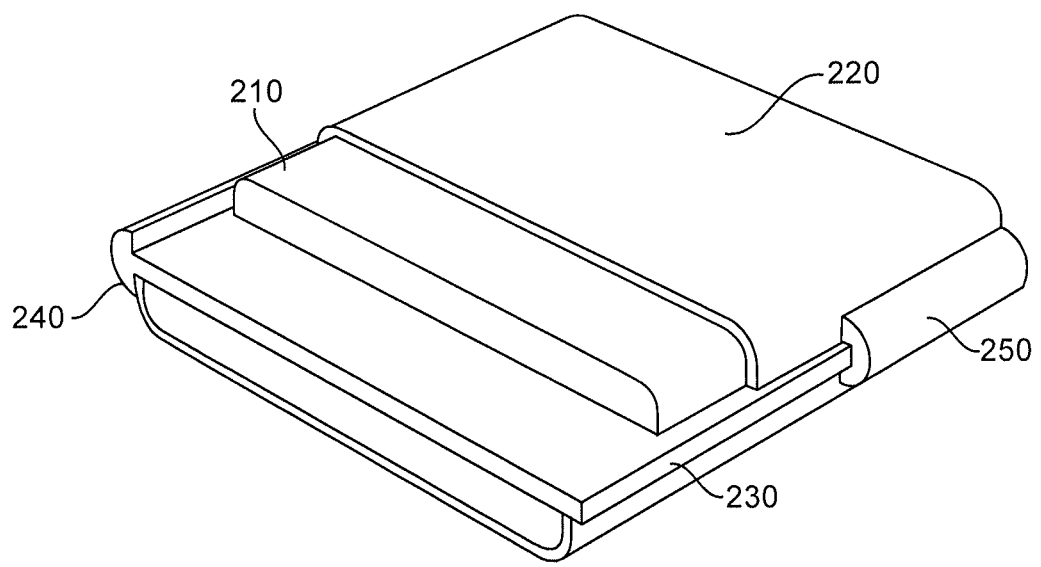
FIG. 2 shows a schematic perspective view of an electrode belt, according to some embodiments of the invention.
Figure 3:
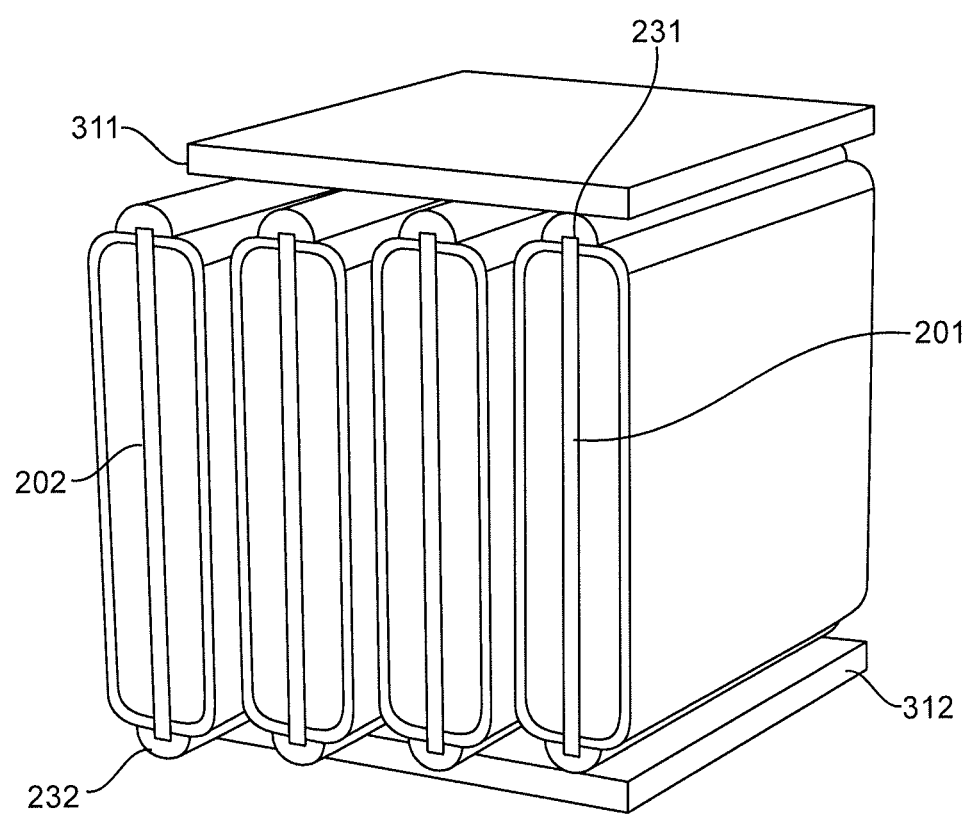
FIG. 3 shows a schematic perspective view of an anode and cathode belts of FIG. 2, contained between anode and cathode current collector members, according to some embodiments of the invention.
Figure 5A:
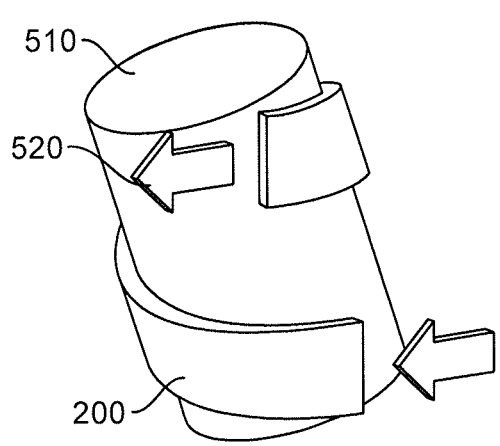
FIGS. 5A and 5B show a schematic diagram and perspective view of a guide wheel that transport electrode belt between the reaction region and the electrode storage region, according to some embodiments of the invention.
Figure 5B:
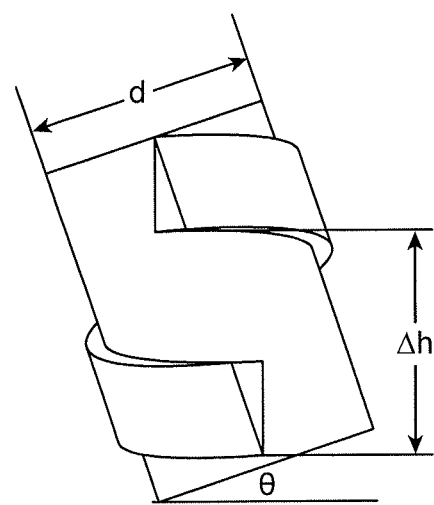

In the example shown in FIG. 3, the device utilizes anode and cathode belts partly coated with an electrically insulating ion permeable membrane, shown in FIG. 2. The reaction region includes an anode current collector member 312 and a cathode current collector member 311 deposed in parallel, and an electrolyte. The conductive edge of anode belt 232 is electronically connected to the anode current collector member 311 in static or sliding contact. The conductive edge of anode belt 231 is electronically connected to the anode current collector member 312 in static or sliding contact. The anode belt is electrically insulated to the cathode belt and the cathode current collector with an electrically insulating membrane and an electrically insulating belt edge. Vice versa to the cathode belts.

Figure 10:
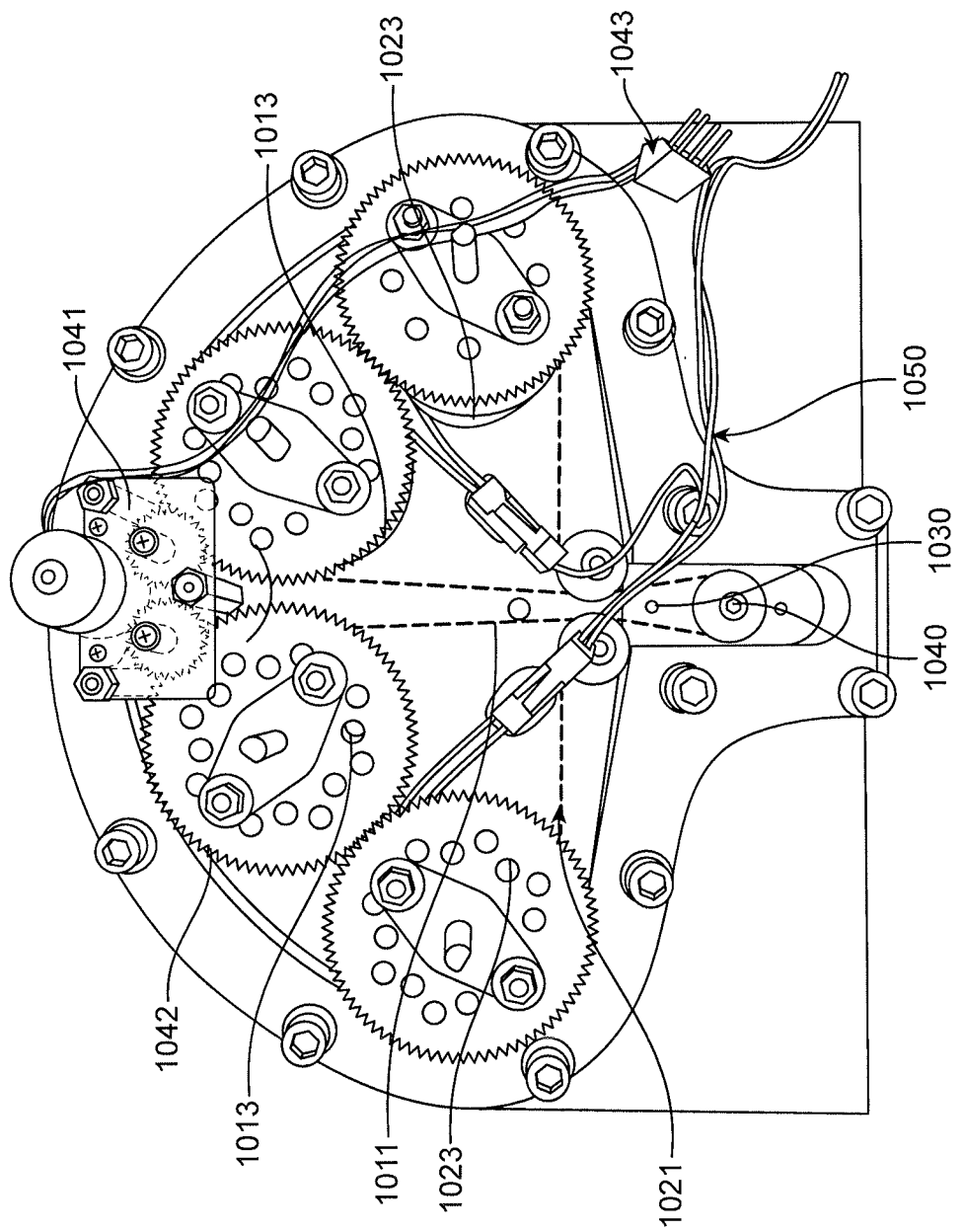
FIG. 10 shows a schematic and prototype of a proof-of-concept solid-flow electrochemical device, according to some embodiments of the invention.

In the example shown in FIG. 10, the device utilize anode and cathode belts completely coated with an electrically insulating ion permeable membrane. The reaction region includes only electrolyte 1030, without any anode current collector member or cathode current collector member. The anode belts and cathode belts are electrically contacted with the anode storage rollers 1013 and cathode storage rollers 1023, which is connected to the external circuit.

In some embodiments, the solid-flow electrochemical device can include an anode active material storage region, and a cathode active material storage region, configured provided extra capacity out of the reaction region. In some other embodiments, a single storage region can be used to store the anode and cathode active materials. In yet some other embodiments, one or both of the anode and cathode active material storage regions can be located outside the electrochemical device (e.g., in an external storage compartment).

The anode active material storage region and the cathode active material storage region can each comprise a first and a second roller. In the example shown in FIG. 12A, the anode belt 1211 coated with the anode active material can be coupled to (e.g., wound around) the first 1213 and second 1214 rollers of the anode active material storage region. Similarly, the cathode belt 1221 coated with the cathode active material can be coupled to (e.g., wound around) the first 1223 and second 1224 rollers of the cathode active material storage region.

Figure 7:
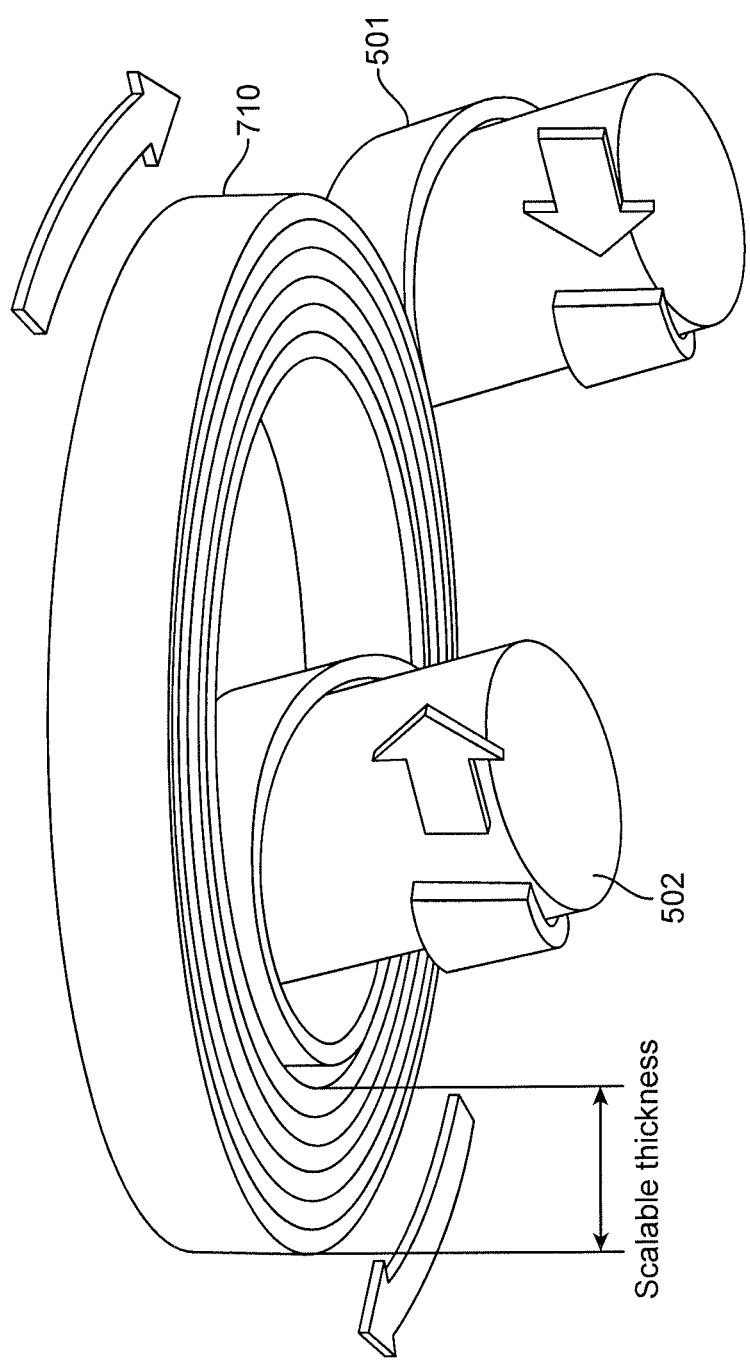
FIG. 7 shows a schematic perspective view of storage region of electrode belts of FIG. 2, with guide wheels of FIG. 5, according to some embodiments of the invention.

In the example shown in FIG. 7, the anode active material storage region and the cathode active material storage region can each comprise a single roller 710. The electrode belt can entrance the storage roller through guide wheel 501, and leave the roller through guide wheel 502. The arrows indicate the moving direction of the electrode belts. In other embodiments of the invention, more than two rollers can be utilized in each active material storage region and in any suitable configuration.

In some embodiments, the at least one motor is configured to feed the anode current collector foil from the first roller of the anode active material storage region around the anode current collector member to the second roller of the anode active material storage region, and to feed the cathode current collector foil from the first roller of the cathode active material storage region around the cathode current collector member to the second roller of the cathode active material storage region. Such movement of the current collector foils with active material coatings can be accomplished by way of the at least one motor causing the rollers in each active material storage region to rotate. In some embodiments, the at least one motor can cause the rollers in the respective active material storage regions to rotate in one direction during a discharge cycle (e.g., when the device is delivering power to a load), and to cause the rollers to rotate in the opposite direction during a charge cycle (e.g., when the device is connected to a charger). Any suitable number of motors can be used. In some embodiments, a first motor is disposed within, and coupled to the first and second rollers of, the anode active material storage region, and a second motor is disposed within, and coupled to the first and second rollers of, the cathode active material storage region. In some other embodiments, a single motor is utilized. And, in still other embodiments, one or more motors can be disposed outside (e.g., external to) the electrochemical device and coupled to the rollers by way of cables, gears, pulleys, and/or the like.

During a discharge operation, where the at least one motor causes the current collector foils to rotate about the current collector assemblies, portions of the active material coatings can be spent or depleted such that the active material is converted from a charged to a discharged state. The at least one motor can continuously drive the discharged portion of electrode belt out of the reaction region and feed "fresh"

active material in the charged state for power generation. As a result, the first and second coils of the active material storage regions can store (e.g., by winding) the active material in the charged and discharged state, respectively. In some embodiments, a first portion of the anode current collector foil is wound around the first roller of the anode active material storage region and coated with the anode active material in a charged state, a second portion of the anode current collector foil is wound around the second roller of the anode active material storage region and coated with the anode active material in a discharged state, a first portion of the cathode current collector foil is wound around the first roller of the cathode active material storage region and coated with the cathode active material in a charged state, and a second portion of the cathode current collector foil is wound around the second roller of the cathode active material storage region and coated with the cathode active material in a discharged state.

In the example shown in FIG. 12A, the "fresh" anode and cathode belts in charged state are fed from anode storage roller 1213 and cathode storage roller 1223, respectively. The "spent" anode belt can be wound around the second anode roller 1214, and the "spent" cathode belt can be wound around the second cathode roller 1224. The "fresh" anode and cathode belts mean the charged belts while the "spent" anode and cathode belts mean the belts after passing through discharge process.

Figure 8:
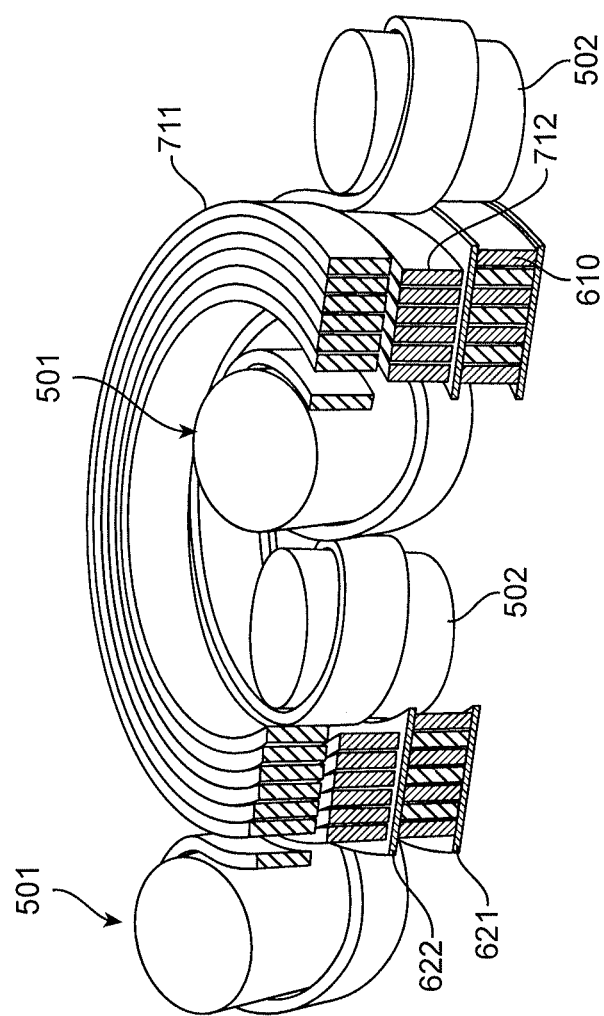
FIG. 8 shows a schematic sectional perspective view of solid-flow electrochemical device, comprising a reaction region of FIG. 6, an anode storage and a cathode storage region of FIG. 7, according to some embodiments of the invention.

In the example shown in FIG. 8, the "fresh" anode and cathode belts in charged state are transported from anode storage roller 711 and cathode storage roller 712, respectively. The "spent" anode belt can be fed back to the original anode storage roller 711, and the "spent" cathode belt can be fed back to the original cathode storage roller 712.

Figure 6:
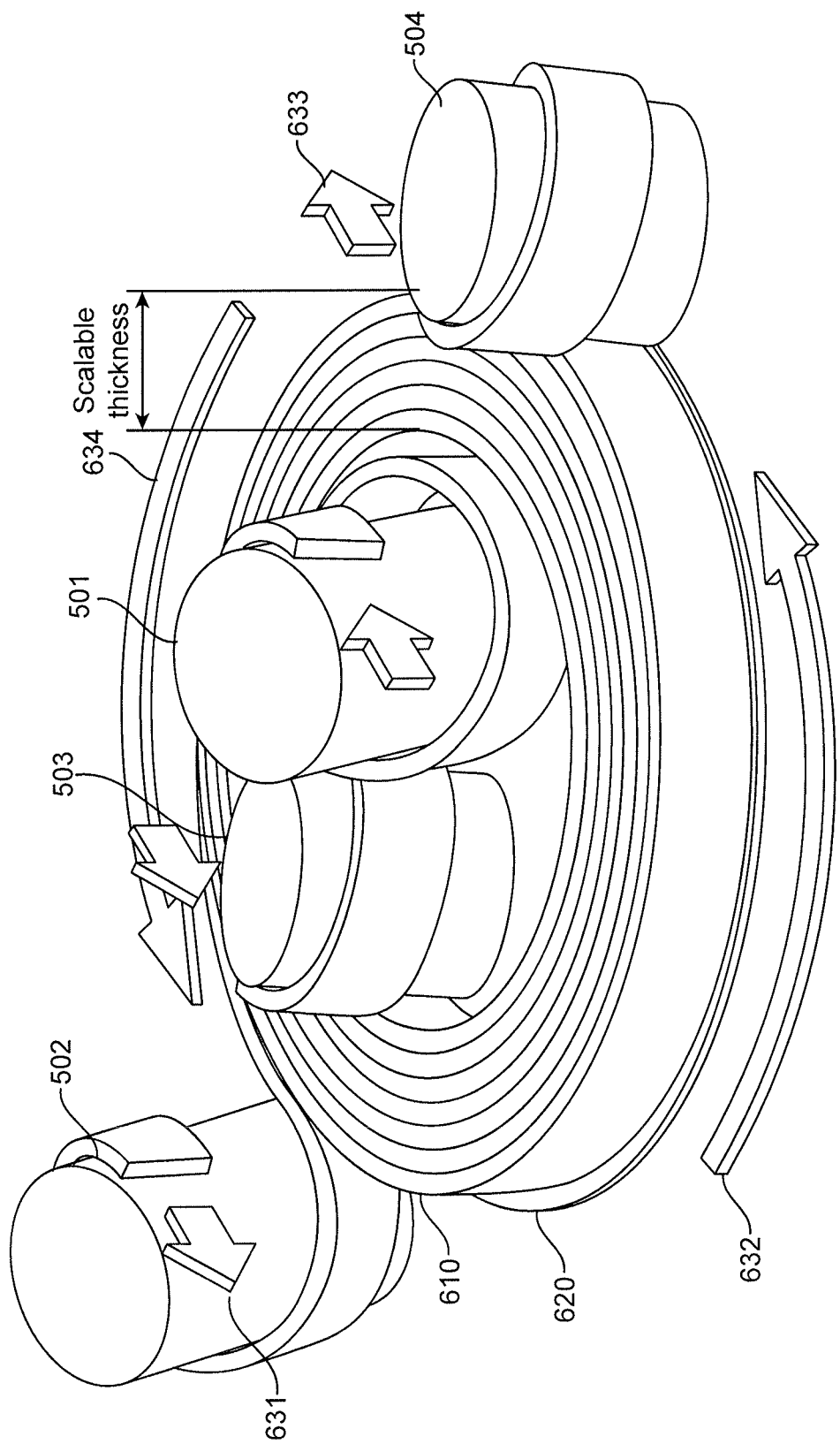
FIG. 6 shows a schematic perspective view of reaction region of electrode belts of FIG'S, with guide wheels of FIG. 5, according to some embodiments of the invention.
Figure 9:
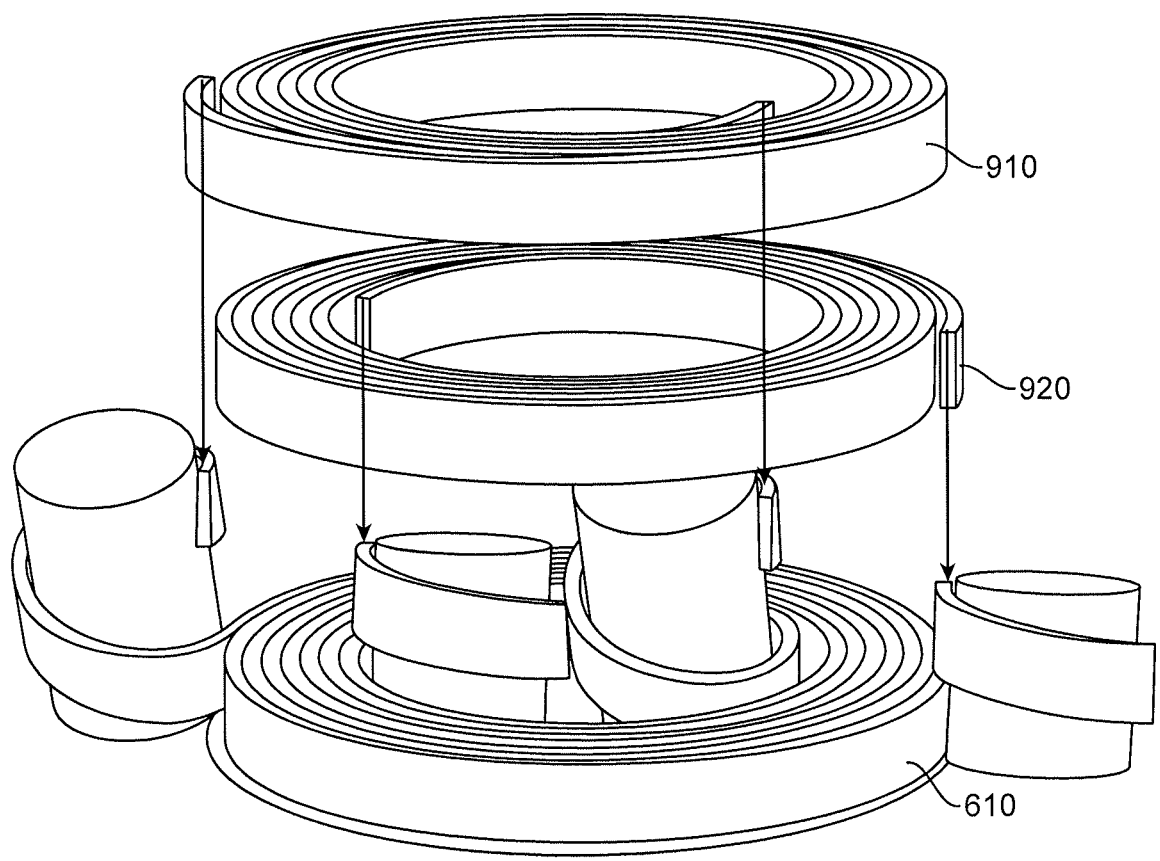
FIG. 9 shows a schematic sectional perspective view of refueling of a solid-flow electrochemical device, by replacing the pack on the anode storage region and the cathode storage region of FIG. 7, with belts connections of FIG. 4, according to some embodiments of the invention.

During a charge operation, where the at least one motor causes the current collector foils to rotate about the current collector assemblies, portions of the active material coatings can be spent or depleted such that the active material is converted from a discharged to a charged state. The at least one motor can continuously drive the electrode belts in a reverse direction of that of the charging operation. In some embodiments shown in FIG. 9, the discharged anode belt in the anode storage region can be entirely replaced with a charged anode belt in package, and the discharged cathode belt in the cathode storage region can be entirely replaced with a charged cathode belt in package. In some embodiments shown in FIG. 6, the discharged anode belt in the reaction region can be replaced by the charged anode belts into the reaction region via continuous feeding, and the discharged cathode belt in the cathode storage region can be replaced by the charged anode belts into the reaction region via continuous feeding, in directions indicated by the arrows.

The anode and cathode active material coatings can comprise any suitable active material. In some embodiments, the anode active material or the cathode active material can comprise a metal fluoride. Exemplary metal fluorides useful in the invention include, but are not limited to, $CuF_2$, $FeF_2$, $FeF_3$, $BiF_3$, $CoF_2$, and $NiF_2$. In some embodiments, the anode active material or cathode active material is $CuF_2$. In some other embodiments, the anode active material or cathode active material is $FeF_2$. In yet other embodiments, the anode active material or cathode active material is $FeF_3$. In still other embodiments, the anode active material or cathode active material is $BiF_3$. In still other embodiments, the anode active material or cathode active material is $CoF_2$. In still other embodiments, the anode active material or cathode active material is $NiF_2$. The anode active material or cathode active material can also be a composite of one or more of $CuF_2$, $FeF_2$, $FeF_3$, $BiF_3$, $CoF_2$, or $NiF_2$ in some embodiments of the invention.

The anode active material or the cathode active material, in some embodiments, can comprise a metal oxide. Exemplary metal oxides useful in the invention include, but are not limited to, $CoO$, $CO_3O_4$, $NiO$, $CuO$, and $MnO$. In some embodiments, the anode active material or cathode active material is $CoO$. In some other embodiments, the anode active material or cathode active material is $CO_3O_4$. In yet other embodiments, the anode active material or cathode active material is $NiO$. In still other embodiments, the anode active material or cathode active material is $CuO$. In still other embodiments, the anode active material or cathode active material is $MnO$. The anode active material or cathode active material can also be a composite of one or more of $CoO$, $CO_3O_4$, $NiO$, $CuO$, or $MnO$ in some embodiments of the invention.

In some embodiments, the anode active material or cathode active material can comprise an intercalation compound of the formula $Li_{1-x-z}M_{1-z}PO_4$, where M is at least one of Ti, V, Cr, Mn, Fe, Co, or Ni, where x is from 0 to 1, and where z can be positive or negative. In some embodiments, M is Ti. In some other embodiments, M is V. In yet other embodiments, M is Cr. In still other embodiments, M is Mn. In still other embodiments, M is Fe. In still other embodiments, M is Co. In still other embodiments, M is Ni. In some other embodiments, M can be two or more of Ti, V, Cr, Mn, Fe, Co, or Ni.

In some embodiments, the anode active material or cathode active material can comprise an intercalation compound of the formula $(Li_{1-x}Z_x)MPO_4$, where M is at least one metal selected from the group consisting of V, Cr, Mn, Fe, Co, and Ni, where Z is a non-alkali metal dopant comprising at least one of Ti, Zr, Nb, Al, or Mg, and where x ranges from 0.005 to 0.05. In some embodiments, M is V. In some other embodiments, M is Cr. In yet other embodiments, M is Mn. In still other embodiments, M is Fe. In still other embodiments, M is Co. In still other embodiments, M is Ni. In some other embodiments, M can be two or more of V, Cr, Mn, Fe, Co, or Ni. In some embodiments, Z is Ti. In some other embodiments, Z is Zr. In yet other embodiments, Z is Nb. In still other embodiments, Z is Al. In still other embodiments, Z is Mg. In some other embodiments, Z can be two or more of Ti, Zr, Nb, Al, or Mg.

The anode active material or cathode active material can comprise an intercalation compound of the formula $LiMPO_4$, where M is at least one metal selected from the group consisting of V, Cr, Mn, Fe, Co, and Ni, and where the intercalation compound is optionally doped at the Li, M, or O-sites. In some embodiments, M is V. In some other embodiments, M is Cr. In yet other embodiments, M is Mn. In still other embodiments, M is Fe. In still other embodiments, M is Co. In still other embodiments, M is Ni. In some embodiments of the invention, M can be two or more of V, Cr, Mn, Fe, Co, or Ni. In some embodiments, the intercalation compound is doped at the Li-sites. In some other embodiments, the intercalation compound is doped at the M-sites. In yet other embodiments, the intercalation compound is doped at the O-sites. In still other embodiments, the intercalation compound is doped at two or more of the Li, M, or O-sites.

In some embodiments, the anode active material or the cathode active material can comprise an intercalation compound comprising an ordered rocksalt compound of the formula $LiMO_2$ having an α-$NaFeO_2$ structure type, an orthorhombic-$LiMnO_2$ structure type, or a derivative of the α-NaFeO$_2$ or orthorhombic-LiMnO$_2$ structure type having different crystal symmetry, atomic ordering, or partial substitution for the metals or oxygen, and wherein M includes at least one first row transition metal and, optionally, at least one non-transition metal selected from the group consisting of Al, Ca, Mg, and Zr. In some embodiments, the LiMO$_2$ intercalation compound has the α-NaFeO$_2$ structure type. In some other embodiments, the LiMO$_2$ intercalation compound has a derivative of the α-NaFeO$_2$ structure type. In yet other embodiments, the LiMO$_2$ intercalation compound has the orthorhombic-LiMnO$_2$ structure type. In yet other embodiments, the LiMO$_2$ intercalation compound has a derivative of the orthorhombic-LiMnO$_2$ structure type. In some embodiments, the LiMO$_2$ intercalation compound includes Al. In some other embodiments, the LiMO$_2$ intercalation compound includes Ca. In yet other embodiments, the LiMO$_2$ intercalation compound includes Mg. In still other embodiments, the LiMO$_2$ intercalation compound includes Zr. In some other embodiments, the LiMO$_2$ intercalation compound includes two of more of Al, Ca, Mg, or Zr.

In some embodiments, the anode active material or the cathode active material can comprise a carbon or carbon-containing material. Exemplary carbon or carbon-containing materials useful in the invention include, but are not limited to, amorphous carbon, disordered carbon, graphitic carbon, metal-coated carbon, and metal-decorated carbon. In some embodiments, the anode active material or the cathode active material comprises amorphous carbon. In some other embodiments, the anode active material or the cathode active material comprises disordered carbon. In yet other embodiments, the anode active material or the cathode active material comprises graphitic carbon. In still other embodiments, the anode active material or the cathode active material comprises metal-coated carbon. In still other embodiments, the anode active material or the cathode active material comprises metal-decorated carbon. In some other embodiments, the anode active material or the cathode active material comprises two or more of amorphous carbon, disordered carbon, graphitic carbon, metal-coated carbon, or metal-decorated carbon.

In some embodiments, the anode active material or the cathode active material can comprise a metallic material. Exemplary metallic materials useful in the invention include, but are not limited to, metals, metal alloys, metalloids, metalloid alloys, and silicon. In some embodiments, the metallic material is a metal. In some other embodiments, the metallic material is a metal alloy. In yet other embodiments, the metallic material is a metalloid. In still other embodiments, the metallic material is a metalloid alloy. In still other embodiments, the metallic material is Si.

The anode active material or the cathode active material can comprise a nanomaterial in some embodiments of the invention. Exemplary nanomaterials useful in the invention include, but are not limited to, nanowires, nanorods, and nanotetrapods. In some embodiments, the nanomaterial is nanowires. In some other embodiments, the nanomaterial is nanorods. In yet other embodiments, the nanomaterial is nanotetrapods. In still other embodiments, the nanomaterial can be two or more of nanowires, nanorods, or nanotetrapods.

In some embodiments, the anode active material or the cathode active material can comprise an organic redox compound. In some embodiments, the anode active material or the cathode active material can comprise a sulfur or selenium-containing compound.

In some embodiments, the anode active material or the cathode active material can comprise a metal. Exemplary metals useful in the invention include, but are not limited to, Li, Na, K, and Mg. In some embodiments, the metal is Li. In some other embodiments, the metal is Na. In yet other embodiments, the metal is K. In still other embodiments, the metal is Mg. In some embodiments of the invention, the metal can be two or more of Li, Na, K, or Mg.

The electrically-insulating ion-permeable membrane can comprise any suitable material that conducts (or otherwise allows diffusion of) ions while acting as an electrical insulator. In some embodiments, the electrically-insulating ion-permeable membrane can comprise a polymer material. Exemplary polymer materials useful in the invention include, but are not limited to, polymer separators, polyethyleneoxide polymer sheets, and sulfonated tetrafluoroethylene-based fluoropolymer-copolymer membranes. In some embodiments, the polymer material comprises one or more polymer separators. In some other embodiments, the polymer material comprises one or more polyethyleneoxide polymer sheets. In yet other embodiments, the polymer material comprises one or more sulfonated tetrafluoroethylene-based fluoropolymer-copolymer membranes. In still other embodiments, the polymer material comprises two or more of polymer separators, polyethyleneoxide polymer sheets, or sulfonated tetrafluoroethylene-based fluoropolymer-copolymer membranes.

In embodiments of the invention, any suitable electrolyte can be used. In some embodiments, a nonaqueous electrolyte can be used. In some other embodiments, an aqueous electrolyte can be used. A non-liquid solid-state electrolyte can also be used and, in such embodiments, both the liquid electrolyte and the ion-permeable membrane can be replaced with a solid-state electrolyte layer.

The anode current collector member, cathode current collector member, anode current collector foil, and cathode current collector foil, can each comprise any suitable electrically conductive material including metals, alloys, metalloids, semiconductors, conductive ceramics, conductive polymers, and/or the like. In some embodiments, the anode current collector member and anode current collector foil can comprise Cu, and the cathode current collector member and cathode current collector foil can comprise Al.

EXAMPLES

The following examples are provided by way of illustration only and not by way of limitation. Those of skill in the art will readily recognize a variety of non-critical parameters that could be changed or modified to yield essentially the same or similar results.

Example 1

Figure 11A:
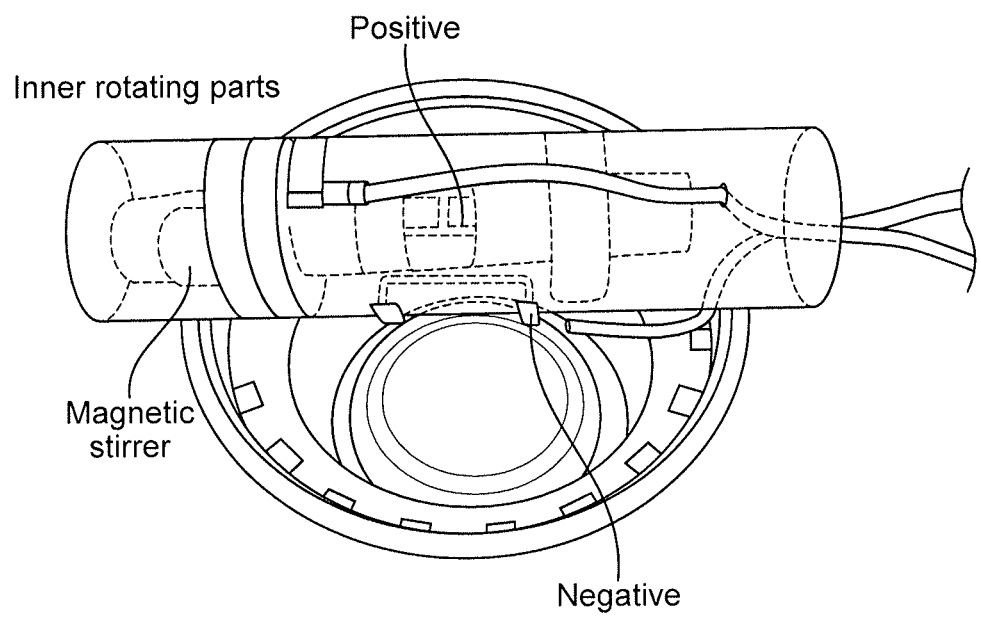
FIGS. 11A and 11B show a schematic of another proof-of-concept solid-flow electrochemical device, according to some embodiments of the invention.
Figure 11B:
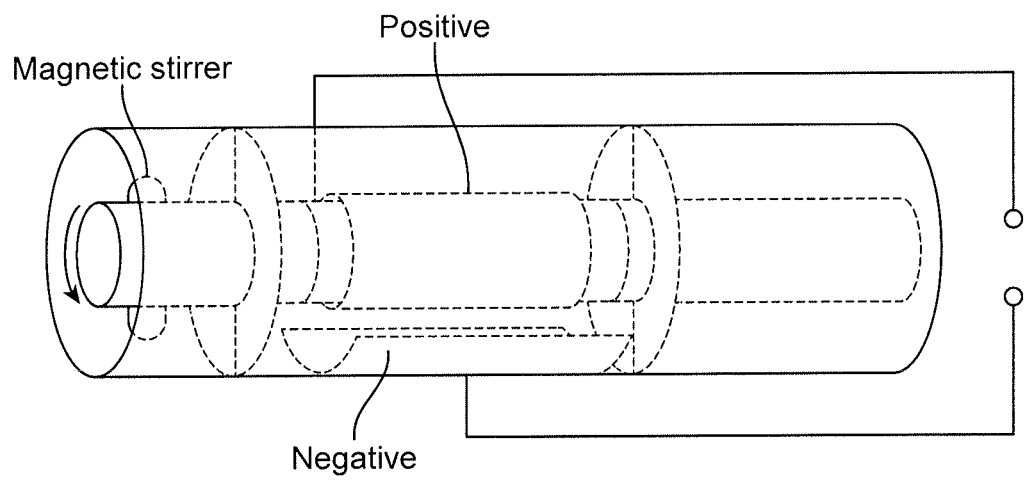

FIGS. 11A and 11B show a schematic and prototype of a proof-of-concept solid-flow electrochemical device. The device includes a housing in which a cathode current collector member is disposed. The cathode current collector member includes a LiFePO$_4$ cathode active material coating. Also within the housing is an anode current collector member mounted with a Li metal anode active material. The anode current collector member is fixed to the housing. A liquid electrolyte is half filled in the housing to make sure that the cathode is partially submerged in it. A magnetic stir bar is mounted on one end of the cathode member and a magnetic stirrer is used to rotate the cathode current collector member with respect to the anode current collector member. The device is electrically coupled to an external circuit.

Figure 13:
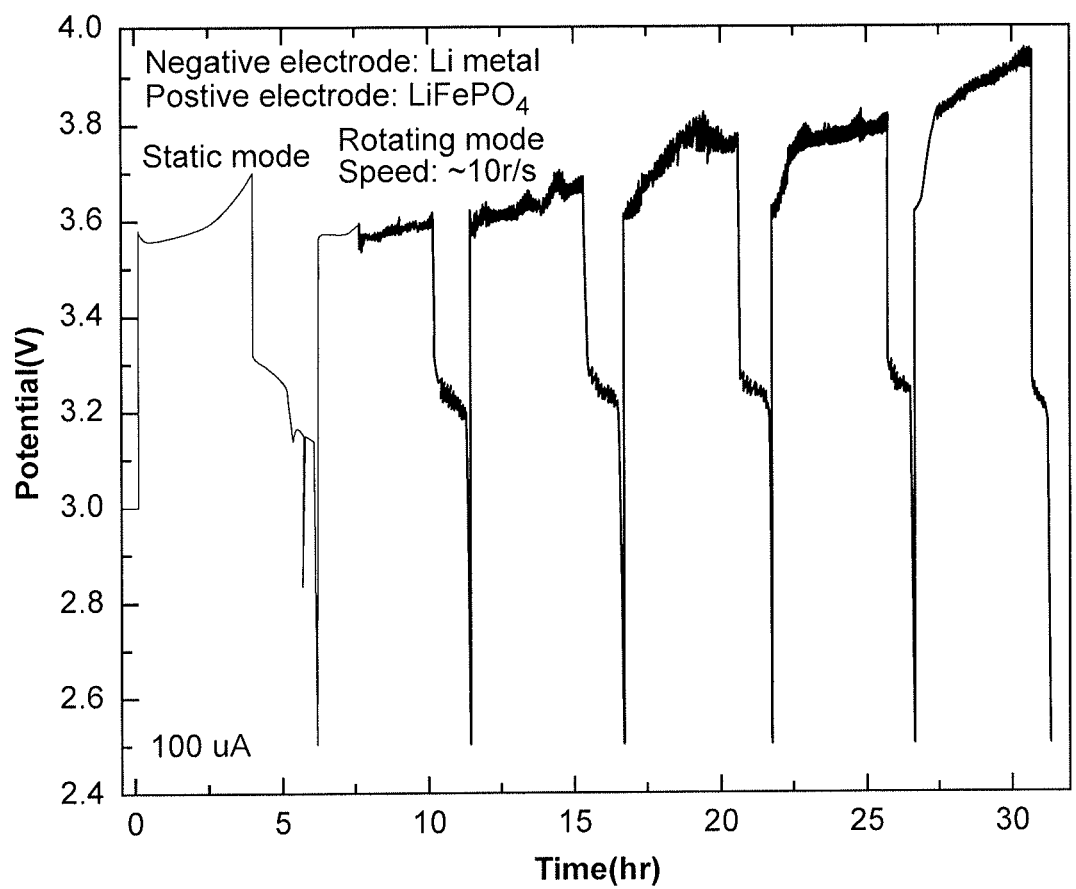
FIG. 13 shows a plot of voltage vs. time over several charge/discharge cycles for the proof-of-concept solid-flow electrochemical device shown in FIG. 12A.

A test of the solid-flow device shown in FIG. 11A was conducted, the results of which are shown in FIG. 13. Specifically, FIG. 13 shows a plot of voltage vs. time over several charge/discharge cycles for the electrochemical device including a Li metal anode active material and a LiFePO$_4$ cathode active material. The first charge/discharge curve (in black) represents the data collected when the cathode material was stationary and not spinning. The subsequent charge/discharge data curves (in orange) were obtained while continuously rotating the LiFePO$_4$ cathode material at an angular velocity of 10 rad/s. As seen in FIG. 13, the testing indicates that the solid-flow electrochemical device works effectively under continuous rotation, providing good cyclability through multiple charge/discharge operations.

Example 2

FIG. 10 shows a schematic and prototype of another proof-of-concept solid-flow electrochemical device. The main body of the device is made of PVC and Acrylic. The device includes two anode storage rollers 1013 and two cathode storage rollers, each made of stainless steel and connected to external circuit. The rotation of the four rollers are controlled by the motor 1041 and gear group 1042.

The device utilizes an anode belt and a cathode belt as media to storage energy. The anode belt comprises of a stainless mesh coated with LiTiPO$_4$ The cathode belt comprises of a stainless mesh coated with LiMnO$_2$. The anode belt and cathode belt are covered with an electrically insulating ion exchange membrane coating by sewing, respectively. The reaction region contents aqueous electrolyte with 1 M Li$_2$SO$_4$, where the membrane-coated anode belts and cathode belts contact directly. The anode belt and cathode belt are connected to external circuit via the conductive anode storage roller and cathode storage roller respectively.

Figure 14A:
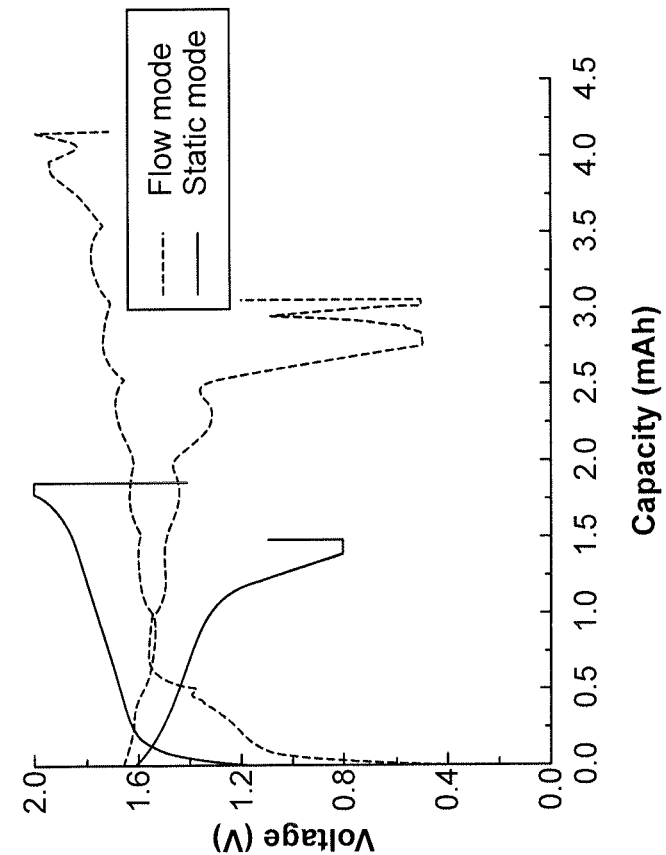
FIGS. 14A and 14B show a plot of voltage vs. time over several charge/discharge cycles for the solid-flow electrochemical device shown in FIG. 10. The prototypes tested included a lithium metal ($LiTiPO_3$) anode active material and a $LiMnO_2$ cathode active material. The first charge/discharge curve (in black) represents the data collected when the cathode material was stationary and not spinning. The subsequent charge/discharge data curves (in orange) were obtained while continuously rotating the both electrode at a frequency of main/rev.
Figure 14B:
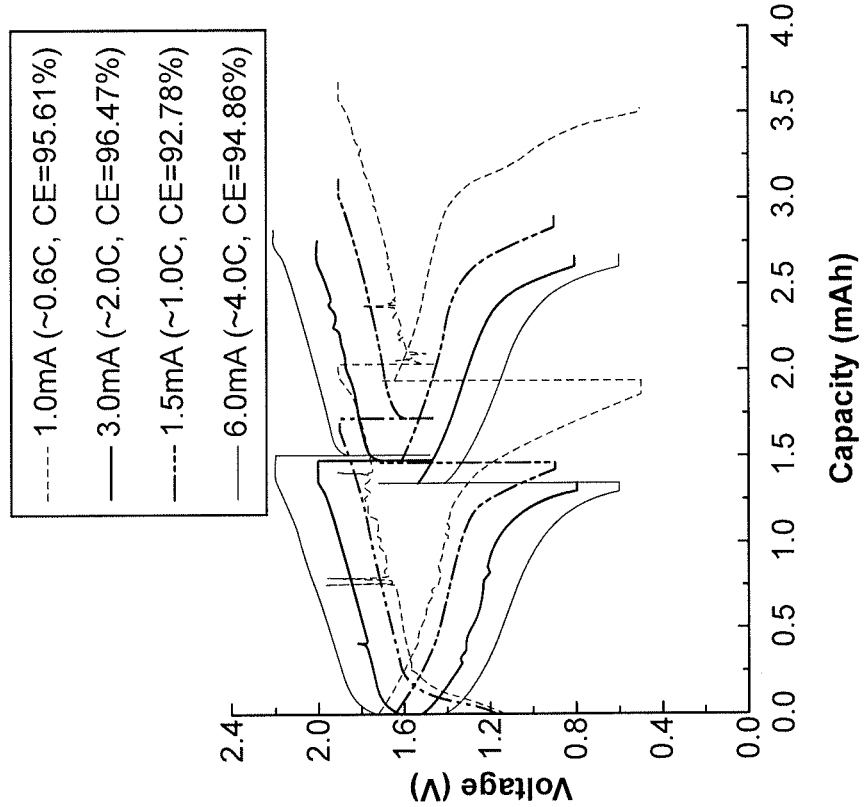

A test of the solid-flow device shown in FIG. 10 was conducted, the results of which are shown in FIGS. 14A and 14B. Specifically, FIG. 14A shows a plot of voltage vs. capacity over two charge/discharge cycles for the electrochemical device including a LiTiPO$_4$ anode active material and a LiMnO$_2$ cathode active material. The first charge/discharge curve (in black) represents the data collected when the cathode material was stationary and not spinning, so that only a portion of electrode belts are involved into reaction. The subsequent charge/discharge data curves (in orange) were obtained while continuously rotating the anode and cathode belt at rotation speed of 30 min/rev, so that full length of electrode belts are involved into reaction.

FIG. 14B, shows an intermittent cycling test under different rate. In an intermittent test the electrode belts are charged at portion A in static mode, then move to portion B and charge again in static mode, then discharge at portion B in static mode, and the move to portion A and discharge in static mode. The portion A and B are neighborhood but not overlap each other. The test indicates that the solid-flow electrochemical device works effectively under intermittent rotation, providing good cyclability and rate performance through multiple charge/discharge operations.

Example 3

Figure 12B:
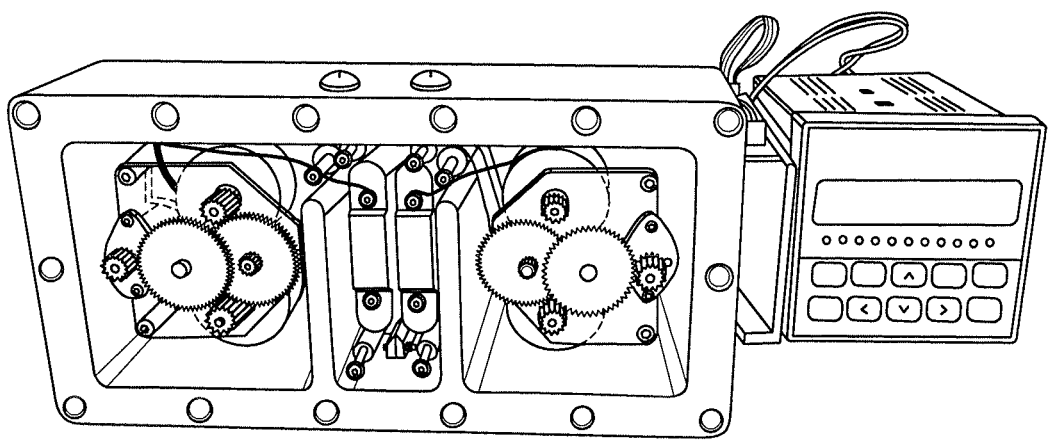

FIGS. 12A and 12B show a schematic and prototype of a solid-flow electrochemical device, according to some embodiments of the invention. As seen in FIG. 12A, the main body of the device includes a stainless steel sealing shell with a flange covering, the main body being divided into three regions by wall-like structures. The three regions include an anode active material storage region "A," a cathode active material storage region "C," and a reaction region "B" disposed between anode active material storage region "A" and cathode active material storage region "C."

Unlike a conventional flow battery, the solid-flow electrochemical cell utilizes an electrode "tape" to supply the active material in lieu of a liquid flow. For example, as shown in FIG. 12A, the device includes an anode current collector foil 1211 coated with an anode active material. Anode active material storage region "A" includes two rotational rollers 1213 and 1214, one for "fresh" (i.e., charged) foil feeding and the other for "spent" (i.e., discharged) foil collection. A motor 1241 is used to control the rotational rollers 8 and is installed within anode active material storage region "A". Motor 1241 and components of reaction region "B" (described below) are connected to an external circuit via wires disposed through the main body including a motor bus. The rollers 1213, 1214 and the motor 1241 are rotationally coupled via a gear group.

Similarly, on the other side of the device, cathode active material storage region "C" includes two rotational rollers (unlabeled), one for "fresh" (i.e., charged) foil feeding and the other for "spent" (i.e., discharged) foil collection. The rollers are controlled by a separate stepper motor 1242, rotationally coupled in storage region "C" via a gear group 1224.

Reaction region "B" includes an anode current collector member 1212, a cathode current collector 1222, and a holder/separator 1230 that fixes an electrically-insulating ion-permeable membrane extending across reaction region "B." As seen in FIG. 12A, the membrane is disposed between anode current collector member 1212 and cathode current collector member 1222. In this example, anode current collector 1212 and the anode current collector foil substrate 1211 are comprised of Cu, whereas cathode current collector member 1222 and the cathode current collector foil substrate 1221 are comprised of aluminum. The current collector foils coated with active material are stretched around the curved surface of the current collector members to maintain electrical contact. Both current collector members and holder/separator 1230 are attached on a PTFE frame to avoid a short circuit between components. The gap between current collectors is adjustable for performance optimization. Reaction region "B" is configured to contain 13 mL of liquid electrolyte which comes into contact with the active material-coated current collector foils prior to reaction. The electrolyte can be injected into reaction region "B" via injection holes at the top of the main body after installation of the flange covering. Bolts can then be inserted into the injection holes for sealing the device.

Rotational rollers 1213 and 1214, and the corresponding rollers on the other side of the device, comprise PTFE. The flexible current collector foils deposited with active material are wound around the rollers, which are driven by the motors and synchronous belts. Using a 1:400 gear ratio and 1/128 micro-driver, the motors can rotate the rollers with a high resolution of 0.084 mm. The motors can be driven by a programmable controller known in the art, which can store programs for charge/discharge cycles.

Solid-flow electrochemical devices, such as those illustrates in FIG. 12A and described herein, provide considerable potential for application in electric/hybrid vehicles in addition to the storage of energy from renewable power sources and the provision of such energy back to the electrical grid. The solid-flow electrochemical devices can also be easily incorporated into existing battery manufacturing production lines, and can provide considerable improvements over existing Li-ion and redox flow batteries available on the market as shown below in Table 1.

TABLE 1

| 85 kWh System | Battery Pack Energy Density (Wh/L) | Battery Pack Gravimetric Energy Density (Wh/kg) | Energy Efficiency | Power Capability (kW) | Battery Pack Cost (USD$/kWh) | Charge Time @ 120 V/15 A | Charge Time @ 240 V/90 A |
|---|---|---|---|---|---|---|---|
| Electric Vehicle Li-ion Battery | 225 | 130 | >95% | 25-100 | 221 | 48 hours | 4 hours |
| Solid-Flow Battery | 174 | 100 | >95% | 20-100 | 193 | 5 minutes | |
| Vanadium Redox Flow Battery | 25 | 18 | 60-70% | 100 | 210-350 | 5 Minutes | |

As seen in Table 1, solid-flow devices according to embodiments of the invention provide advantages over existing electric vehicle batteries, including much faster charging capability due to the direct replacement of the conventional electrode stack, higher volumetric and gravimetric energy density, and reduced battery cost due to the reduction in dimensions of the ion-permeable layer. As further shown in Table 1, the solid-flow batteries also provide advantages over existing redox flow batteries, including more than 7 times higher volumetric energy density, 5 times higher gravimetric energy density, significantly higher energy efficiency, and reduced battery cost.

The mechanical components of the solid-flow device such as the rollers, motors, and cell housing can be isolated from the electrochemical reaction to avoid corrosion and mechanical wear.

Although the foregoing invention has been described in some detail by way of illustration and example for purposes of clarity of understanding, one of skill in the art will appreciate that certain changes and modifications can be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

All patents, patent applications, and other publications cited in this application are hereby incorporated herein by reference in the entirety for all purposes.

The invention claimed is:

1. A solid-flow electrochemical device comprising:
   (1) a reaction compartment divided into separate anode and cathode reaction regions, the compartment comprising:
   a solid moveable anode belt comprising an anode active material in the anode reaction region;
   a solid moveable cathode belt comprising a cathode active material in the cathode reaction region;
   a stationary anode current collector member, electrically connected to the anode belt, either in static or sliding contact;
   a stationary cathode current collector member, electrically connected to the cathode belt, either in static or sliding contact;
   a stationary ion-permeable membrane that fluidically separates the anode reaction region from the cathode reaction region, held in place between the anode belt and the cathode belt;
   a stationary liquid electrolyte solution in the anode reaction region that physically separates the anode belt from the ion-permeable membrane; and
   a stationary liquid electrolyte solution in the cathode reaction region that physically separates the cathode belt from the ion-permeable membrane;
   (2) an anode belt storage compartment configured to store and electrically insulate the anode belt outside of the anode reaction region;
   (3) a cathode belt storage compartment configured to store and electrically insulate the cathode belt outside of the cathode reaction region; and
   (4) a reversible motor that drives the anode belt in either direction during a charge or discharge operation:
   (5) a second reversible motor that drives the cathode belt in either direction independently of the anode belt during the charge or discharge operation;
   (6) a plurality of guide wheels that are configured and arranged such that the anode belt passes through the stationary liquid electrolyte solution in the anode reaction region in contact with the anode current collector member and apart from the ion permeable membrane; and the cathode belt passes through the stationary liquid electrolyte solution in the cathode reaction region in contact with the cathode current collector member and apart from the ion permeable membrane.

2. The solid-flow electrochemical device of claim 1, wherein the anode belt is coated with an electrically-insulating ion-permeable membrane, and the cathode belt is coated with an electrically-insulating ion-permeable membrane.

3. The solid-flow electrochemical device of claim 1, wherein at least one of the electrolyte solutions contains an electrochemically oxidizable or reducible species, wherein said species is $Li_2SO_4$.

4. The solid-flow electrochemical device of claim 1, wherein:

a first portion of the anode belt is wound around a first roller of the anode belt storage compartment in a charged state;

a second portion of the anode belt is wound around a second roller of the anode belt storage compartment in a discharged state;

a first portion of the cathode belt is wound around a first roller of the cathode belt storage compartment in a charged state;

a second portion of the cathode belt is wound around a second roller of the cathode belt storage compartment in a discharged state;

at least one motor is configured to drive the anode belt from the first roller of the anode belt storage compartment around the anode current collector member to the second roller of the anode belt storage compartment; and at least one motor is configured to drive the cathode belt from the first roller of the cathode belt storage compartment around the cathode current collector member to the second roller of the cathode belt storage compartment.

5. The solid-flow electrochemical device of claim 4, wherein the rollers in the anode belt storage compartment are both rotationally coupled to the motor that drives the anode belt via a gear group; and wherein the rollers in the cathode belt storage compartment are both rotationally coupled to the motor that drives the cathode belt via a gear group.

6. The solid-flow electrochemical device of claim 1, further comprising:

at least one guide wheel configured to feed the anode belt forward from a storage roller in the anode belt storage compartment through the anode reaction region in contact with the anode current collector member and apart from the ion permeable membrane;

at least one guide wheel configured to feed the anode belt back to the storage roller in the anode belt storage compartment;

at least one guide wheel configured to feed the cathode belt forward from a storage roller in the cathode belt storage compartment through the cathode reaction region in contact with the anode current collector member and apart from the ion permeable membrane; and at least one guide wheel configured to feed the cathode belt back to the storage roller in the cathode belt storage compartment.

7. The solid-flow electrochemical device of claim 1, wherein the anode active material or the cathode active material comprises:

a metal fluoride selected from $CuF_2$, $FeF_2$, $FeF_3$, $BiF_3$, $CoF_2$, and $NiF_2$;

a metal oxide selected from CoO, $CO_3O_4$, NiO, CuO, and MnO;

an intercalation compound of the formula $Li_{1-x-z}M_{1-z}PO_4$ wherein M is at least one first row transition metal selected from Ti, V, Cr, Mn, Fe, Co, and Ni, wherein x is from 0 to 1, and wherein z can be positive or negative;

an intercalation compound of the formula $(Li_{1-x}Z_x)MPO_4$, wherein M is at least one metal selected from V, Cr, Mn, Fe, Co, and Ni, wherein Z is a non-alkali metal dopant comprising at least one of Ti, Zr, Nb, Al, or Mg, and wherein x ranges from 0.005 to 0.05;

an intercalation compound of the formula $LiMPO_4$, wherein M is at least one metal selected from V, Cr, Mn, Fe, Co, and Ni, and wherein the intercalation compound is optionally doped at the Li, M, or O-sites; or an intercalation compound comprising an ordered rock-salt compound of the formula $LiMO_2$ having an α-$NaFeO_2$ structure type, an orthorhombic-$LiMnO_2$ structure type, or a derivative of the α-$NaFeO_2$ or orthorhombic-$LiMnO_2$ structure type having different crystal symmetry, atomic ordering, or partial substitution for the metals or oxygen, wherein M includes at least one first row transition metal and, optionally, at least one non-transition metal selected from Al, Ca, Mg, and Zr.

8. The solid-flow electrochemical device of claim 1, wherein the anode active material or the cathode active material comprises:

a carbon material selected from amorphous carbon, disordered carbon, graphitic carbon, metal-coated carbon, and metal-decorated carbon;

a sulfur or selenium-containing compound; or a metal selected from lithium, sodium, potassium, and magnesium.

9. The solid-flow electrochemical device of claim 1, wherein the ion-permeable membrane comprises a polymer material selected from polymer separators, polyethyleneoxide polymer sheets, and sulfonated tetrafluoroethylene-based fluoropolymer-copolymer membranes.

10. A method of using the solid-flow electrochemical device according to claim 1, comprising:

electrically connecting the solid-flow electrochemical device to a load; and drawing power from the solid-flow electrochemical device to the load, thereby discharging the solid-flow electrochemical device.

11. The solid-flow electrochemical device of claim 1, which has a volumetric energy density in the order of 102 Wh/L or greater.

12. The solid-flow electrochemical device of claim 1, wherein the ion permeable membrane is held in place by a holder/separator that is electrically insulated from the anode current collector member and the cathode current collector member.

13. The solid-flow electrochemical device of claim 1, wherein spacing between the anode current collector member and the cathode current collector member is adjustable for performance optimization.

14. The solid-flow electrochemical device of claim 1, wherein the liquid electrolyte solution between the anode belt and the ion-permeable membrane, and the liquid electrolyte solution between the cathode belt and the ion-permeable membrane, do not flow into or out of the reaction compartment during normal operation of the device.

15. The solid-flow electrochemical device of claim 1, configured such that discharged anode belt in the anode belt storage compartment can be replaced with charged anode belt by pack replacing, and discharged cathode belt in the cathode belt storage compartment can be replaced with charged cathode belt by pack replacing, thereby refueling the solid-flow electrochemical device.

16. The solid-flow electrochemical device of claim 1, configured such that discharged anode belt in the anode belt storage compartment can be charged by reversing the direction of the anode belt, and discharged cathode belt in the cathode belt storage compartment can be charged by reversing the direction of the cathode belt, thereby refueling the solid-flow electrochemical device.

17. A solid-flow electrochemical device comprising the following components:
(1) a reaction compartment that includes:
an anode reaction region containing a solid anode collection member and a liquid electrolyte solution that both remain stationary during operation of the device;
a cathode reaction region containing a solid cathode collection member and a liquid electrolyte solution that both remain stationary during operation of the device; and
an ion-permeable membrane that fluidically separates the anode reaction region from the cathode reaction region, held in place between the electrolyte solution in the anode reaction region and the electrolyte solution in the cathode reaction region;
(2) a solid moveable anode belt passing through the electrolyte solution in the anode reaction region at a position where the electrolyte solution physically separates the anode belt from the ion-permeable membrane;
(3) an anode belt storage compartment situated outside and electrically insulated from the anode reaction region; and
(4) a motor configured to drive the anode belt in either direction through the electrolyte solution in the anode reaction region from the anode belt storage compartment during a charge or discharge operation;
wherein the components of the device are configured and arranged such that the anode belt passes from the anode belt storage compartment through the anode reaction region in contact with the anode current collector member and apart from the ion permeable membrane and then back to the anode belt storage compartment.

18. The solid-flow electrochemical device of claim 17, wherein the anode belt comprises an anode active material coated with an electrically-insulating ion-permeable membrane.

19. The solid-flow electrochemical device of claim 17, wherein the anode belt storage compartment contains a first storage roller and a second storage roller, wherein the motor is configured to drive the anode belt from the first storage roller through the anode reaction region to the second storage roller during the charge operation, and to drive the anode belt from the second storage roller through the anode reaction region to the first storage roller during the discharge operation.

20. The solid-flow electrochemical device of claim 17, further comprising:
(5) a solid moveable cathode belt passing through the electrolyte solution in the cathode reaction region at a position where the electrolyte solution physically separates the cathode belt from the ion permeable membrane;
(6) a cathode belt storage compartment situated outside and electrically insulated from the cathode reaction region; and
(7) a motor configured to drive the cathode belt in either direction through the electrolyte solution in the cathode reaction region from the cathode belt storage compartment during the charge or discharge operation.

21. A solid-flow electrochemical device comprising the following components:
(1) a reaction compartment that includes:
an anode reaction region containing a solid anode collection member and a liquid electrolyte solution that both remain stationary during operation of the device;
a cathode reaction region containing a solid cathode collection member and a liquid electrolyte solution that both remain stationary during operation of the device; and
an ion-permeable membrane that fluidically separates the anode reaction region from the cathode reaction region, held in place between the electrolyte solution in the anode reaction region and the electrolyte solution in the cathode reaction region;
(2) a solid moveable cathode belt passing through the electrolyte solution in the cathode reaction region at a position where the electrolyte solution physically separates the cathode belt from the ion permeable membrane;
(3) a cathode belt storage compartment situated outside and electrically insulated from the cathode reaction region; and
(4) a motor configured to drive the cathode belt through the electrolyte solution in the cathode reaction region from the cathode belt storage compartment in either direction during a charge or discharge operation;
wherein the components of the device are configured and arranged such that the cathode belt passes from the cathode belt storage compartment through the cathode reaction region in contact with the cathode current collector member and apart from the ion permeable membrane and then back to the cathode belt storage compartment.

22. The solid-flow electrochemical device of claim 21, wherein the cathode belt comprises a cathode active material coated with an electrically-insulating ion-permeable membrane.

23. The solid-flow electrochemical device of claim 21, wherein the cathode belt storage compartment contains a first storage roller and a second storage roller, wherein the motor is configured to drive the cathode belt from the first storage roller through the cathode reaction region to the second storage roller during the charge operation, and to drive the cathode belt from the second storage roller through the cathode reaction region to the first storage roller during the discharge operation.

* * * * *